United States Patent [19]
Feinbloom

[11] 4,182,552
[45] Jan. 8, 1980

[54] SIDE VIEW MIRROR EMPLOYING PRISM FOR BLIND SPOT CORRECTION

[76] Inventor: William Feinbloom, Pancake Hollow Rd., Rte. 2, Highland, N.Y. 12328

[21] Appl. No.: 938,052

[22] Filed: Aug. 30, 1978

[51] Int. Cl.² .............................................. G02B 5/08
[52] U.S. Cl. ................................................. 350/303
[58] Field of Search ........................ 350/303, 304, 290

[56] References Cited

U.S. PATENT DOCUMENTS

| | | | |
|---|---|---|---|
| 2,514,989 | 7/1950 | Buren | 350/290 |
| 3,151,207 | 9/1964 | Moller | 350/303 |

FOREIGN PATENT DOCUMENTS 2425502 12/1975 Fed. Rep. of Germany ........... 350/303
2441088 3/1976 Fed. Rep. of Germany ........... 350/303

*Primary Examiner*—Jon W. Henry
*Attorney, Agent, or Firm*—Arthur L. Plevy

[57] ABSTRACT

There is disclosed a composite mirror assembly adapted to be mounted adjacent the driver of a vehicle to enable the dirver to view objects, as other vehicles, within an area normally hidden from view by conventional vehicle mirrors. An additional mirror is positioned at an angle with respect to the conventional side mirror. The angle selected is between six to ten degrees with respect to the surface of the side mirror. In this manner, the additional mirror as positioned enables the driver of the vehicle to view objects within said area, which objects would normally be hidden from view by conventional and existing apparatus.

1 Claim, 6 Drawing Figures

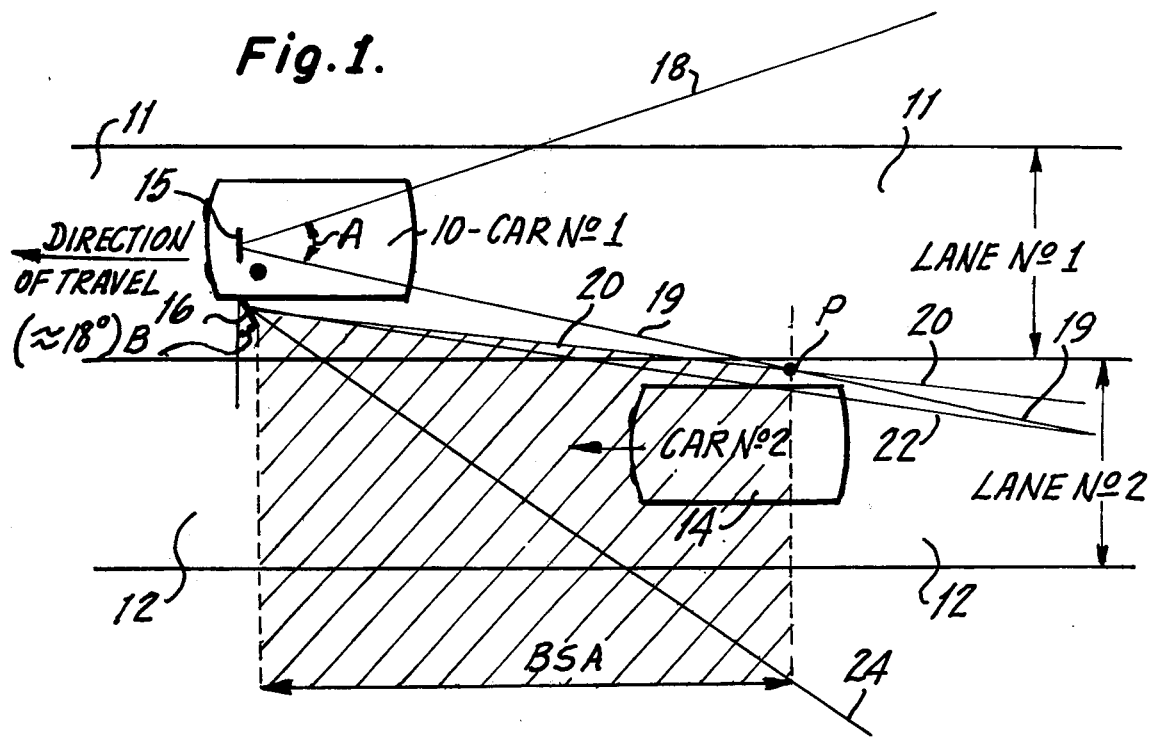
Fig. 1.
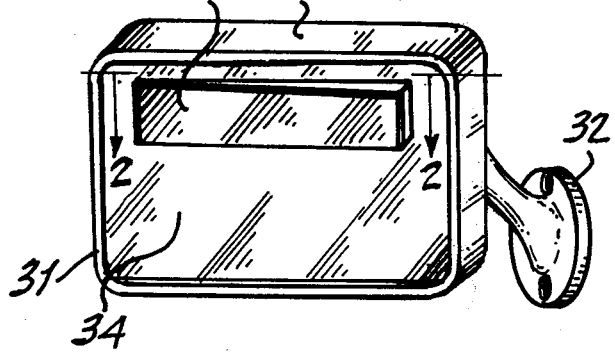
Fig. 2.
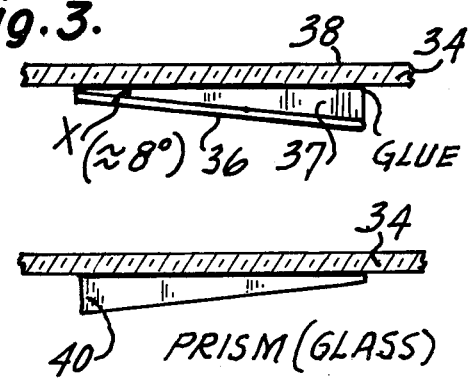
Fig. 3.
Fig. 4.
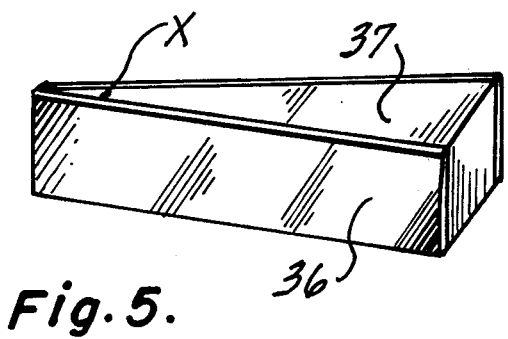
Fig. 5.
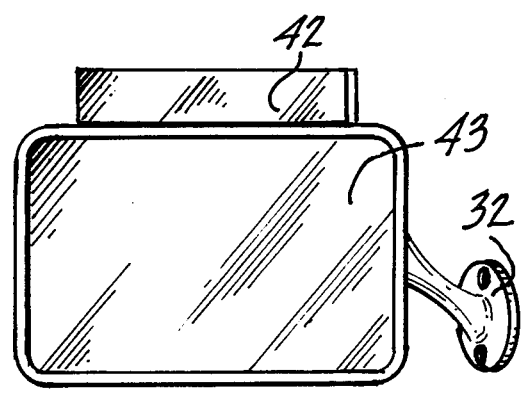
Fig. 6.

SIDE VIEW MIRROR EMPLOYING PRISM FOR BLIND SPOT CORRECTION

BACKGROUND OF INVENTION

The present invention relates to side view mirrors for vehicles and, more particularly, to an additional mirror tilted at an angle with respect to a conventional side view mirror to allow a driver to properly view traffic conditions at the rear of his vehicle.

The prior art has provided composite mirror assemblies for affecting the field of view of a motor vehicle for various purposes.

Hence, the prior art depicts various systems and arrangements of composite mirror assemblies. U.S. Pat. No. 3,337,285 entitled VEHICLE REAR VIEW MIRROR WITH CONVEX PORTION issued on Aug. 22, 1967 to V. Travis employs a convex mirror for rear viewing. Other patents as U.S. Pat. No. 3,443,295 entitled MEMORY MIRROR show the use of two or more mirrors which can be rotated to enable different drivers of the same vehicle to avoid adjusting the mirror each time the vehicle is used.

Different configurations are shown in U.S. Pat. Nos. 3,659,929, 3,592,532, 3,797,920 and other patents as well.

It would suffice to say that while various configurations of mirror assemblies are depicted in the prior art, as noted above, the problems and apparatus employed in this invention have not been ascertained, nor do such prior art devices lend themselves to the solution of the problems and the apparatus described herein.

Generally, the prior art techniques as those which employ curved mirror surfaces distort the field of view, while other devices are extremely complicated and require frequent adjustment and maintenance. Still other devices do not contemplate or solve the problem depicted herein together with the apparatus necessary.

It is therefore an object of the present invention to provide an improved side view mirror apparatus for a vehicle, which apparatus is simple and inexpensive to implement, while serving to enhance the viewing capability of a driver of the vehicle, thus maintaining a greater degree of safety.

BRIEF DESCRIPTION OF PREFERRED EMBODIMENT

In combination with a side view mirror of a vehicle, the side view mirror having a relatively planar reflecting surface and positioned on the side of said vehicle near the position of the vehicle driver for providing visual access to the rear of said vehicle, said side view mirror operative in conjunction with a conventional rear view mirror located within said vehicle to enable said driver to view traffic conditions at the rear of the vehicle, said mirrors undesirably providing a blind spot area in said visual field of view at the driver's side of said vehicle, the improvement therewith of apparatus comprising correction means coupled to said side view mirror at an angle with respect thereto of between six to ten degrees to provide a visual field of view for said driver determinative of said blind spot area to thereby enable said driver to have visual access to said blind spot area.

BRIEF DESCRIPTION OF THE DRAWINGS

FIG. 1 is a schematic diagram depicting a top view of two vehicles and employed to describe the problem solved by apparatus according to this invention.

FIG. 2 is a perspective view of a side mirror according to this invention.

FIG. 3 is a top view of a first and second mirror assembly according to this invention.

FIG. 4 is a top view of an alternate embodiment employing a prism.

FIG. 5 is a plan view of an additional corrective mirror assembly.

FIG. 6 is a front view of still another alternate embodiment.

DETAILED DESCRIPTION OF THE INVENTION

The nature of the problem to be solved by the apparatus will be described in detail in conjunction with reference to FIG. 1.

In every vehicle, such as a conventional automobile, there is a "blind spot" or area present. A driver of a vehicle normally employs a rear view mirror and a side view mirror (positioned on the driver's side of the vehicle) to view traffic conditions at the rear of his vehicle.

FIG. 1 depicts a vehicle 10 (car 1) which is located in a highway lane 11. Adjacent the lane 11 is another lane 12 and another vehicle 14. As is seen from the FIG., the vehicle 14 is behind the vehicle 10. The driver of vehicle 10 is designated by the reference numeral F and he has visual access to the rear view mirror 15 and a conventional side view mirror 16. As is known, the lanes 11 and 12 may exist on a highway, street and so on and multiple lane traffic roadways are quite common.

As above indicated, there is a blind spot created for the driver F when both his rear view mirror 15 and side view mirror 16 are properly and conventionally adjusted. This "blind spot" or area always exists and prevents the driver from viewing a predetermined area behind his vehicle by the use of the mirrors 15 and 16. Hence, the driver F in checking the view from mirror 15 and then from mirror 16 cannot see the vehicle 14, which is in lane 12 and in the instance shown, to his left. The car 14, if traveling at a similar speed as car 10 and located as shown, will be in a "blind area" and will not be visible in either mirror. Hence, if driver F should desire to change lanes and enter into lane 12 or the adjoining lane, he might easily cause an accident and there would not be enough time to avoid the vehicle 14. The situation briefly described causes great problems in everyday traffic and does, in fact, cause many accidents.

As indicated, the driver of car 10 is located at point F. It is, of course, realized that there are variations in regard to the visual capabilities of individuals, such as eye separation, height, and so on, but the analysis of the problem or the problem itself exists apart from all differences of such types.

Essentially, the rear view mirror 15 provides a viewing angle of about thirty degrees (angle A of FIG. 1). This angle may, of course, vary somewhat, but thirty degrees is typical and any variations will not be greater than about plus or minus five degrees. The rear view mirror gives a partial view of the lane 12 when it is correctly adjusted. The field of view is depicted by lines 18 and 19 of FIG. 1. Hence, as one can ascertain, if car 14 is far enough behind car 10, the driver F will see the car 14 in his rear view mirror.

The side view mirror 16 is normally tilted at an angle of about eighteen degrees to a line drawn at right angles to the main axis of the car 10 (along the length). The angle B is thus at about eighteen degrees and also may vary about plus or minus one or two degrees, again depending upon the position of the driver, the distance between his eyes, his height and position in the seat.

The side view mirror is always tilted by a driver to help him see towards the rear and along the side of his car to cover the view of lane 12 as much as he is able. The positioning of the side mirror at this angle as above described, from a physical point of view is both desirable and recommended by various agencies such as the AAA and by auto manufacturers and so on. In positioning the side view mirror 16, the driver F must maintain some rearward part of his vehicle in view in order to have some base or reference point to judge how far other cars are from him to the rear. The driver F is unable to do this with any accuracy by using mirror 15 because no part of his own vehicle is seen in viewing by the mirror 15.

Therefore, with respect to the side view mirror 16 as properly set for the driver F, his field of view is determined by angle B and he cannot see anything to the left of line 20.

It is noted that line 19 of the field of view of rear view mirror 16 intersects line 20 at a point designated as P. Hence, everything to the left of line 20 and within the area between car 10 and point P in lane 12 is not viewed by the driver F and hence, this defines the blind spot or blind area.

It is also understood that some of the field seen by the side view mirror 16 is also lost to the driver F because a portion of his car 10 is reflected in mirror 16, but this is relatively small compared to the actual blind spot area.

As seen in FIG. 1, the area defining the blind spot or blind spot area (BSA) is shown cross-hatched and is quite substantial. Hence, as car 14 moves into this area, it cannot be seen by driver F in either the rear view mirror 15 or the side view mirror 16. If car 14 begins to travel at the same or relatively at the same speed as car 10, the driver F will not see car 14 and hence, if he decides to change lanes, an accident can occur, upon his entering lane 12.

The invention presented herein is to overcome the blind spot area and inform the driver F as to whether it is safe to move into the lane 12 by allowing him to view the lane condition before moving into the lane.

FIG. 1 depicts lines 22 and 24 shown emanating from the side view mirror 16. The field of view area contained between lines 22 and 24 enables the driver F to view the car 14 which according to prior art mirror arrangements, would be hidden from view.

As will be explained, an additional mirror is positioned on or with respect to the conventional side view mirror 16. The additional mirror is mounted or positioned at an angle of between six to ten degrees (optimumly at about eight degrees) with respect to the planar surface of mirror 16. Hence, the additional mirror has a field of view for the driver F containing the area encompassed between lines 22 and 24 and therefore affords the driver a full view of the blind spot area.

It is, of course, understood that the dimensions shown in the FIG. are not to scale, but detailed scale drawings have been made based on the length of the car equal to approximately fifteen feet, with a width of about five feet. The rear view mirror 15 is located at the center of the car with a field of view of about thirty degrees. The angle of tilt of the side view mirror 16 is taken at about eighteen degrees, with the width of the lanes 11 and 12 at about eleven feet. For such dimensions, the point P is located at about thirty feet from the position of the rear view mirror 15. When measurements were made with two conventional automobiles, the data above described correlates quite well.

Hence, by attaching or positioning an additional mirror tilted with respect to the surface of the side view mirror 16 at an angle between six to ten degrees (eight or nine degrees optimumly), one eliminates the blind spot problem and enables the driver F to safely change lanes by viewing the field accommodated by the additional mirror.

Beyond point P or more than thirty feet from the rear view mirror, the original side view mirror 16 picks up the view. The additional mirror to be described covers the entire adjacent lane 12 at the thirty foot point evidenced by the area bounded between lines 22 and 24.

Referring to FIG. 2, there is shown a typical side view mirror assembly 30. As is conventional, a side view mirror is contained within a suitable frame or housing 31. The housing 31 is conventionally coupled to an arm or bracket 32 which in turn is coupled to the driver's side of the car. The housing 31 is adjustable in all directions and hence, can be tilted up or down or sideways, as is known, to allow a driver to position the housing and hence, the mirror 34 contained in the housing as desired and in the manner above described.

As indicated, the housing 31 contains a mirror surface 34 to enable the driver to view traffic conditions at the rear of his vehicle. The mirror 34 is conventionally a planar mirror having a relatively flat surface and numerous examples of suitable structures for both the mirror 34 and the housing 31 exist and are known to the prior art.

Shown positioned on the surface of the planar mirror 34 is an additional mirror 36. Mirror 36 is mounted on a wedge which provides an angle of eight degrees with respect to the planar surface of mirror 34. Hence, as one can ascertain from FIG. 2, the additional mirror 36 is tilted by a wedge configuration with the thicker portion of the wedge located closer to the driver's position. The size of the additional mirror may be between one-third to one-half of the height of the side view mirror, although other sizes can be used.

Referring to FIG. 3, there is shown a top view to clearly depict the nature of the mirror 36.

Essentially, the mirror 34 is a planar or flat mirror and the additional mirror 36 is positioned on the mirror and tilted at an angle between six to ten degrees with respect to the surface of mirror 34.

In the embodiment shown in FIG. 3, a wedge of material 37 has a surface at an angle X of between six to ten degrees (eight degrees optimum). The mirror may be glued, epoxied, pasted or clamped directly unto the mirror 34. One can use a double backed adhesive 38 or a suitable binder for bonding the wedge 37 to mirror 34. The wedge member may be fabricated from any material which is relatively durable and light, such as aluminum, plastic, wood, composite materials and so on. A mirror 36 is mounted on the sloping surface of the wedge member and this provides the required field of view as described above.

It is, of course, understood that one could fabricate the mirror 36 and the wedge from an integral piece of material such as glass, plastic and so on. Techniques for providing mirrored surfaces on all sorts of materials are well known in the art and hence, any such techniques can be employed.

It is also envisioned that the reflecting surface of mirror 36 is tinted or colored to enable the driver to immediately understand and recognize the field of view of mirror 36 with respect to mirror 34. In this manner, the mirror 36 can be tinted almost any color to thereby enable one to distinguish between the views from mirrors 34 and 36.

FIG. 4 shows an alternate embodiment of a configuration which will also operate according to the above described principles. Shown positioned on the surface of a conventional side mirror 34 is a prism 40. The prism 40 is formed from a wedge of plastic or glass and is of the type used in optics and readily available. The prism is formed at the same angle of eight degrees or between six to ten degrees, but the angle is directed opposite to that of the mirror member 36. The prism 40 is in a "base out" position and serves to deflect the light from the rear of the automobile directly upon the mirrored surface of mirror 34. In this manner, the original mirror 34 is employed and the prism 40 alters the light to provide the field of view of the blind spot by bending the light rays.

Any color effects provided by the use of the prism 40 can be color corrected in the fabrication of the prism. Color correction of such prisms is known in the optical art. The prism can further be colored or tinted and hence, the area of mirror 34 which is covered by the prism presents the proper field of view for blind spot compensation.

FIG. 5 shows an enlarged view of an additional mirror configuration which can be positioned directly upon the surface of a conventional side view mirror. As indicated, the angle X is about eight degrees and the mirror surface 36 can be formed either directly upon the wedge material 37 or pasted thereon as is known.

FIG. 6 offers still another embodiment, wherein a mirror 42 is positioned at the desired angle with respect to the side view mirror 43. It is understood that the tilt of mirror 42 always has to be at the same eight degrees with respect to the surface of mirror 43 and hence, as mirror 43 is adjusted, mirror 42 is also adjusted.

It is also understood that one can fabricate a composite mirror whereby a portion of the mirror is tilted at eight degrees with respect to the rest of the mirror. Hence, one can form a single mirror having a first tilted portion and a second planar portion and accomplish the same compensation.

It is noted that the above techniques enable the use of this invention with existing side view mirrors and hence, the benefits are available for all present vehicles. It is understood that new vehicles or those yet to be manufactured can accommodate integral structures as indicated above.

Many modifications and alternatives are available and will be understood by those skilled in the art and are deemed to be encompassed within the scope and breadth of the claims presented herein.

I claim:

1. In combination with a side view mirror of a vehicle, said side view mirror having a relatively planar reflecting surface and positioned on the side of said vehicle near the position of the vehicle driver for providing visual access to the rear of said vehicle, said side view mirror operative in conjunction with a conventional rear view mirror located within said vehicle to enable said driver to view traffic conditions at the rear of said vehicle, said mirrors undesirably providing a blind spot area in said visual field of view at the driver's side of said vehicle, the improvement therewith of apparatus, comprising:

correction means coupled to said side view mirror at an angle with respect thereto of between six to ten degrees to provide a visual field of view for said driver determinative of said blind spot area to thereby enable said driver to have visual access to said blind spot area, wherein said correction means comprises a glass prism positioned over a portion of said planar surface with the base of said prism facing out from the driver's side of the vehicle, the base angle of the prism being between six to ten degrees, whereby refraction of light by the glass prism is employed to provide correction of said blind spot area.

* * * * *